United States Patent
Lissajoux et al.

(10) Patent No.: US 10,036,651 B2
(45) Date of Patent: Jul. 31, 2018

(54) ELECTRONIC DEVICE AND METHOD FOR AIDING THE PILOTING OF AN AIRCRAFT, WITH CALCULATION AND DISPLAY OF AT LEAST A ROLL MARGIN, RELATED COMPUTER PROGRAM PRODUCT

(71) Applicant: THALES, Courbevoie (FR)

(72) Inventors: Sylvain Lissajoux, Toulouse (FR); Bruno Aymeric, Le Haillan (FR); Didier Poisson, Toulouse (FR)

(73) Assignee: THALES, Corbevoie (FR)

( * ) Notice: Subject to any disclaimer, the term of this patent is extended or adjusted under 35 U.S.C. 154(b) by 6 days.

(21) Appl. No.: 15/176,682

(22) Filed: Jun. 8, 2016

(65) Prior Publication Data

US 2016/0363459 A1 Dec. 15, 2016

(30) Foreign Application Priority Data

Jun. 11, 2015 (FR) ...................................... 15 01211

(51) Int. Cl.
*B64D 43/02* (2006.01)
*G01C 23/00* (2006.01)

(52) U.S. Cl.
CPC ........... *G01C 23/005* (2013.01); *B64D 43/02* (2013.01)

(58) Field of Classification Search
CPC ...... B64D 43/02; B64D 43/00; G01C 23/005; G01C 23/00; G05D 1/0607; G05D 1/0816; G05D 1/08; G05D 1/0808
See application file for complete search history.

(56) References Cited

U.S. PATENT DOCUMENTS

| | | | |
|---|---|---|---|
| 4,247,843 A * | 1/1981 | Miller | G01C 23/005 116/DIG. 43 |
| 4,910,513 A * | 3/1990 | Kelly | G05D 1/0607 340/966 |
| 6,937,166 B2 | 8/2005 | Godard et al. | |
| 8,442,701 B2 | 5/2013 | Blechen | |

(Continued)

FOREIGN PATENT DOCUMENTS

| | | |
|---|---|---|
| EP | 1 310 769 A1 | 5/2003 |
| EP | 2 738 099 A1 | 6/2014 |
| FR | 2 975 796 A1 | 11/2012 |

OTHER PUBLICATIONS

French Search Report, dated Mar. 23, 2016, for corresponding French Application.

*Primary Examiner* — Abby Y Lin
(74) *Attorney, Agent, or Firm* — Young & Thompson

(57) ABSTRACT

This electronic device for aiding with the piloting of an aircraft includes: an acquisition module, configured to acquire a current value of the roll angle of the aircraft; a computing module configured to compute a roll angle limit corresponding to a beginning of stalling of the aircraft; and a display module, configured to display, on a screen, a first symbol indicating a current orientation of the aircraft. The computing module is configured to compute at least one roll margin, each roll margin depending on a corresponding roll angle limit and the current value of the roll angle, and the display module is configured, when the display condition is verified, to display, on the screen, at least one second symbol positioned relative to the first symbol, the deviation between each second symbol and the first symbol representing a respective roll margin.

15 Claims, 6 Drawing Sheets

(56) References Cited

U.S. PATENT DOCUMENTS

| | | |
|---|---|---|
| 8,548,653 B2 | 10/2013 | Puig et al. |
| 9,174,742 B2 | 11/2015 | Nelson |
| 2012/0016540 A1* | 1/2012 | Louise .................. G05D 1/085 701/8 |
| 2012/0303186 A1* | 11/2012 | Puig .................... G01C 23/005 701/18 |
| 2014/0371957 A1* | 12/2014 | Riedinger ............. B64D 43/02 701/3 |

* cited by examiner

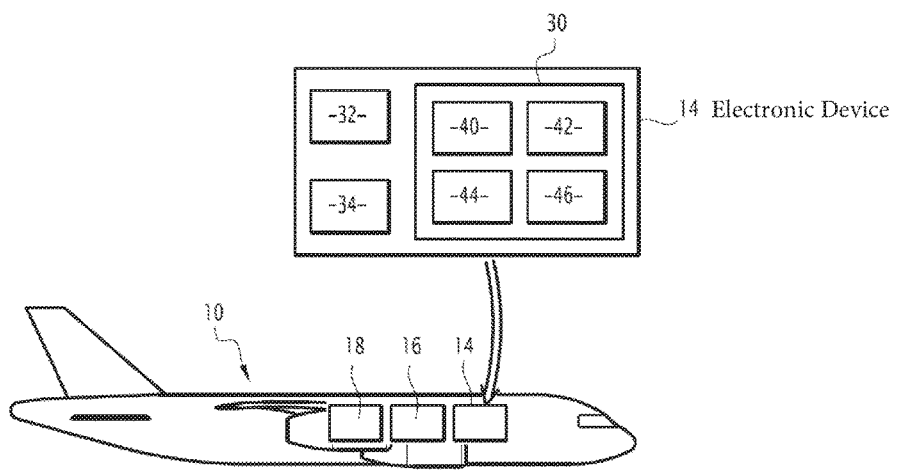
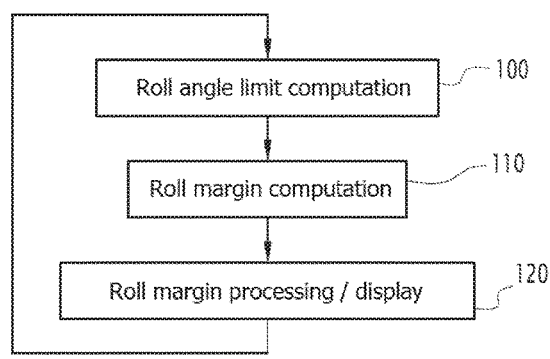
FIG.1
FIG.2

ELECTRONIC DEVICE AND METHOD FOR AIDING THE PILOTING OF AN AIRCRAFT, WITH CALCULATION AND DISPLAY OF AT LEAST A ROLL MARGIN, RELATED COMPUTER PROGRAM PRODUCT

FIELD OF THE INVENTION

The present invention relates to an electronic device for aiding with the piloting of an aircraft, the device comprising an acquisition module configured to acquire a current value of the roll angle of the aircraft, a computing module configured to compute at least one roll angle limit corresponding to a beginning of stalling of the aircraft, and a display module configured to display, on the screen, a first symbol indicating a current orientation of the aircraft.

The invention also relates to a method for aiding the piloting of an aircraft, the method being implemented by such an electronic device.

The invention also relates to a non-transitory computer-readable medium including a computer program, also called computer program product, including software instructions which, when they are implemented by a computer, carry out such a method.

The invention applies to the field of avionics, and more particularly to the field of systems for aiding with piloting relative to a stalling risk of the aircraft.

"Aircraft" refers to a moving vehicle piloted by at least one pilot, and in particular able to fly in the Earth's atmosphere, such as an airplane, a drone or a helicopter.

"Pilot" refers to a person piloting the aircraft from a cockpit situated in the aircraft or at a distance therefrom.

The pilot, through his piloting actions, acts on the attitude and roll, and it is therefore important for him to be able to be aware of the maneuvering margins with respect to stalling of the aircraft.

BACKGROUND OF THE INVENTION

An electronic device and method of the aforementioned type are known from document U.S. Pat. No. 8,442,701 B2. This document describes a flight management method comprising, in response to a vertical maneuver of the aircraft, the identification of a roll angle limit by using a selected load factor to allow a vertical maneuvering capacity of the aircraft, and performing the vertical maneuvering of the aircraft by using said roll angle limit. The use of this roll angle limit seeks to avoid stalling of the aircraft, in particular during a low-speed lateral maneuver.

However, such a flight management method does not provide satisfactory aid to the pilot, the roll angle limit being directly taken into account by the flight management system to perform the maneuver of the aircraft.

SUMMARY OF THE INVENTION

The present invention aims to propose an electronic device and method for aiding with the piloting of an aircraft allowing the pilot to better anticipate a risk of stalling of the aircraft, while decreasing the cognitive load requested from the pilot, and then improving the flight safety.

To that end, the invention relates to an electronic device for aiding with the piloting of an aircraft, the device comprising:

an acquisition module configured to acquire a current value of the roll angle of the aircraft, a computing module configured to compute at least one roll angle limit corresponding to the beginning of stalling of the aircraft, and a display module configured to display, on a screen, a first symbol indicating a current orientation of the aircraft, wherein the computing module is further configured to compute at least one roll margin, each roll margin depending on a corresponding roll angle limit and the current value of the roll angle, and wherein the display module is further configured, when the display condition is verified, to display, on the screen, at least one second symbol positioned relative to the first symbol, the deviation between each second symbol and the first symbol representing a respective roll margin.

According to other advantageous aspects of the invention, the piloting aid electronic device comprises one or more of the following features, considered alone or according to all technically possible combinations:

at least one roll margin is equal to the difference between a corresponding roll angle limit and the current value of the roll angle;

each roll margin depends on a characteristic value of the angle of attack, the characteristic value of the angle of attack being preferably an angle of attack limit corresponding to a beginning of stalling of the aircraft;

the roll angle depends on a current value of the angle of attack of the aircraft, the current value of the roll angle of the aircraft and an angle of attack limit corresponding to beginning of stalling of the aircraft;

the roll angle limit is calculated by the following equation:

$$\phi_{lim} = \arccos\left[\cos(\phi) \times \frac{(\alpha - \alpha_0)}{(\alpha_{lim} - \alpha_0)}\right]$$

where $\Phi$ represents the current value of the roll angle,
$\alpha$ represents the current value of the angle of attack,
$\alpha_{lim}$ represents the angle of attack limit, and
$\alpha_0$ represents an angle of attack with zero lift, specific to the aircraft;

the current value of the angle of attack is computed as a function of a measured value of the angle of attack and an estimate of the time derivative of the angle of attack;

the estimate of the time derivative of the angle of attack is calculated by the following equation:

$$\dot{\alpha} = q + \frac{g}{V} \times (\sin\theta \times \sin\alpha + \cos\theta \times \cos\phi \times \cos\alpha - n_x \times \sin\alpha - n_z \times \cos\alpha)$$

where q represents the pitch level,
g is the gravitational acceleration, V represents the aerodynamic speed of the aircraft,
θ represents the attitude of the aircraft,
$\Phi$ represents the current value of the roll angle,
$\alpha$ represents the current value of the angle of attack,
$n_x$ represents the longitudinal component of the load factor, and
$n_z$ represents the vertical component of the load factor;
the roll angle limit depends on a dynamic pressure applied to the aircraft, a lift specific to the aircraft and an angle of attack limit corresponding to a beginning of stalling of the aircraft;

the roll angle limit is calculated by the following equation:

$$\phi_{lim} = \arccos\left[\frac{2}{\rho \cdot V^2 \times S \times C_{Z\alpha}} \times \frac{m \times g}{(\alpha_{lim} - \alpha_0)}\right]$$

where $(\rho V^2)/2$ represents the dynamic pressure applied to the aircraft,

S represents a reference surface of the aircraft, $C_{Z\alpha}$ represents the lift gradient, specific to the aircraft, m represents the mass of the aircraft, g is the gravitational acceleration, $\alpha_{lim}$ represents the angle of attack limit, and $\alpha_0$ represents an angle of attack with zero lift, specific to the aircraft;

the computing module is further configured to compute several roll margins;

the computing module is further configured to compute several roll angle limits;

the first symbol indicating a current orientation of the aircraft is chosen from among a speed vector symbol of the aircraft and an artificial horizon line; and the display condition is verified in particular when the absolute value of the current value of the roll angle is above a predefined threshold, and the display module is then configured to automatically display each second symbol on the screen.

The invention also relates to a method for aiding with piloting of an aircraft, the method being implemented by an electronic device and comprising:

acquiring a current value of the roll angle of the aircraft, computing at least one roll angle limit corresponding to a beginning of stalling of the aircraft, and displaying, on the screen, a first symbol indicating a current orientation of the aircraft, computing at least one roll margin, each roll margin depending on a corresponding roll angle limit and the current value of the roll angle, and when a display condition is verified, displaying, on the screen, at least one second symbol positioned relative to the first symbol, the deviation between each second symbol and the first symbol representing a respective roll margin.

The invention also relates to a non-transitory computer-readable medium including a computer program including software instructions which, when implemented by computer equipment, carry out a method as defined above.

BRIEF DESCRIPTION OF THE DRAWINGS

These features and advantages of the invention will appear more clearly upon reading the following description, provided solely as a non-limiting example, and done in reference to the appended drawings, in which:

FIG. 1 is a diagrammatic view of an aircraft including an electronic device according to the invention for aiding with piloting of the aircraft;

FIG. 2 is a flowchart of a method for aiding with piloting of the aircraft, implemented by the electronic device of FIG. 1;

DETAILED DESCRIPTION OF PREFERRED EMBODIMENTS

Figure 3:
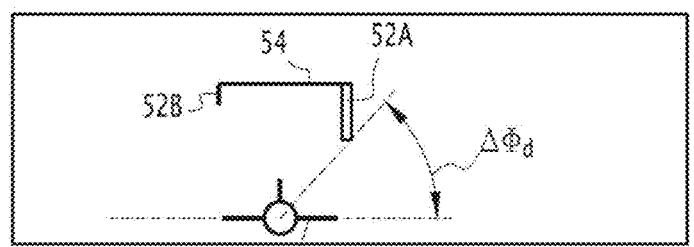
FIGS. 3 to 6 are diagrammatic views illustrating, for different configurations of the aircraft, the display of a first symbol indicating a current orientation of the aircraft and second symbols positioned relative to the first symbol, the deviation between each second symbol and the first symbol representing a respective roll margin, according to a first example of the two symbols.

In the example of FIG. 1, the aircraft 10 is an airliner able to be piloted by at least one pilot. The piloting of the aircraft 10 includes different flight phases, for example the takeoff, ascent, descent and landing phases.

According to other examples, the aircraft 10 is an aircraft of another type, for example a corporate airplane or a military airplane, or a helicopter.

According to still another example, the aircraft 10 is a drone piloted remotely by a pilot from a piloting unit remote from the aircraft.

The "flight envelope" of an aircraft generally refers to a set of limitations/conditions applicable to the aircraft 10 guaranteeing its safe operation. Traditionally, these are conditions regarding the load factor, roll, angle of attack or speed of the aircraft 10.

"Stalling" refers to a loss, generally abrupt, of the lift of a carrying structure of the aircraft 10, such as a wing, the set of wings, a tail unit of the aircraft, or one or more rotor blades in the case of a helicopter. In case of stalling, the aircraft 10, which is no longer lifted enough (in part or in whole), generally becomes uncontrollable and loses altitude very quickly.

In the rest of the description, the notation $\alpha$ represents the angle of attack of the aircraft 10.

The angle of attack $\alpha$ is a critical parameter for piloting of the aircraft 10, and more particularly an angle of attack margin $\Delta\alpha$ relative to a stalling angle of attack. The stalling angle of attack is a parameter specific to the aircraft 10. The stalling angle of attack for example varies as a function of conditions related to the aircraft, such as its configuration (leading edge slat/tabs/gear), the state of its systems (engine, deicing, speed, mass, etc.) and outside conditions, for example the formation of ice on all or some of the airfoils.

Various causes may lead to a reduction in the angle of attack margin $\Delta\alpha$ with respect to stalling, for example a variation in air conditions (wind, turbulence), a variation in the load factor of the aircraft, or a variation of the roll $\Phi$ of the aircraft.

In the rest of the description, the notation $\Phi$ represents the roll angle of the aircraft 10, commonly called roll.

The aircraft 10 comprises an electronic device 14 for aiding with piloting, a guidance system 16 and a set of sensors 18 suitable for measuring various variables associated with the aircraft.

The electronic device for aiding with piloting 14 is able to provide a pilot of the aircraft 10 during piloting thereof, in particular via the display of relevant information with respect to a flight of the aircraft, in particular with information making it possible to alert the pilot of a risk of stalling of the aircraft 10.

As an optional addition, the electronic device for aiding with piloting 14 is also able to send the guidance system 16 said relevant information, in particular a roll angle limit $\Phi_{lim}$ and a roll margin $\Delta\Phi_g\Delta$, $\Phi_d$, so that they may be taken into account by the guidance system 16.

The electronic device 14 for aiding with piloting is for example an onboard computer for example including a memory 30 and a processor 32 associated with the memory 30.

As an optional addition, the electronic device 14 for aiding with piloting further includes a display screen 34. In an alternative that is not shown, the display screen associated with the device for aiding with piloting 14 is a remote screen, which is not integrated into the piloting aid device 14, the display screen then for example being the screen of another piece of equipment or avionics system of the aircraft 10.

The guidance system 16 is, for example, an automatic pilot device 16, also called auto-flight control system (AFCS), also called automatic pilot (AP), or a flight management system (FMS) of the aircraft. Additionally, the guidance system is an auto-thrust device, not shown, also called automatic throttle. The automatic pilot device and/or the auto-thrust device are known in themselves, and make it possible to act on the trajectory of the aircraft. The flight management system is known in itself, and is suitable for managing a flight plan of the aircraft 10, from takeoff to landing.

The set of sensors 18 is configured in particular to measure variables associated with the movement of the aircraft 10, and to send the measured values of said variables in particular to the piloting aid device 14 and/or to the guidance system 16.

The sensors 18 are in particular suitable for providing information relative to the position of the aircraft 10, such as angles of attack, in particular the angle of attack $\alpha$ and the roll angle $\Phi$, accelerations, ground speed, route, altitude, latitude, longitude and/or relative to the environment of the aircraft 10, preferably relative to the atmosphere in which the aircraft 10 is moving, for example a pressure or a temperature.

The memory 30 is able to store a program 40 for acquiring a current value of the roll angle $\Phi$ of the aircraft and a program 42 for computing at least one roll angle limit $\Phi_{lim}$ corresponding to a beginning of stalling of the aircraft 10 and at least one roll margin $\Delta\Phi_g$, $\Delta\Phi_d$.

The memory 30 is also able to store a program 44 for displaying, on the screen 34, a first symbol indicating a current orientation of the aircraft, such as a speed vector symbol 50 or an artificial horizon line 60 or an airplane model, and furthermore, when a display condition is verified, at least one second symbol 52A, 52B positioned relative to the first symbol 50, 60, the deviation between each second symbol 52A, 52B and the first symbol 50, 60 and the respective roll margin $\Delta\Phi_g$, $\Delta\Phi_d$.

As an optional addition, the memory 30 is able to store a program 46 for sending the guidance system 16 the roll angle limit $\Phi_{lim}$ and the roll margin $\Delta\Phi_g$, $\Delta\Phi_d$.

The processor 32 is configured to execute each of the programs 40, 42, 44, 46.

When executed by the processor 32, the acquisition program 40, the computing program 42, the display program 44, and optionally additionally the transmission program 46, respectively form an acquisition module configured to acquire the current value of the roll angle $\Phi$, a computing module configured to compute each roll angle limit $\Phi_{lim}$ and each roll margin $\Delta\Phi_g$, $\Delta\Phi_d$, a display module configured to display, on the screen 34, the first symbol 50, 60 and furthermore, when the display condition is verified, each second symbol 52A, 52B, and optionally additionally a module for sending the guidance system 16 the roll angle limit $\Phi_{lim}$ and the computed roll margin $\Delta\Phi_g$, $\Delta\Phi_d$.

Alternatively, the acquisition module 40, the computing module 42 and the display module 44 are made in the form of programmable logic components, such as one or more FPGA (Field-Programmable Gate Array), or in the form of dedicated integrated circuits of the ASIC (Application-Specific Integrated Circuit) type.

The acquisition module 40 is configured to acquire the current value of the roll angle $\Phi$ of the aircraft 10, this current value for example being provided by the set of sensors 18.

As an optional addition, the acquisition module 40 is furthermore configured to acquire the current value of the angle of attack $\alpha$ of the aircraft 10, an angle of attack limit $\alpha_{lim}$, and a predefined zero lift angle of attack $\alpha_0$, and to send them to the computing module 42, to compute the or each roll angle limit $\Phi_{lim}$.

Alternatively or as an optional addition, the acquisition module 40 is configured to acquire, furthermore, a dynamic pressure applied to the aircraft 10, denoted $(\rho V^2)/2$, a lift gradient $C_{z\alpha}$ specific to the aircraft 10 and the angle of attack limit $\alpha_{lim}$, and to send them to the computing module 42, in order to compute the or each roll angle limit $\Phi_{lim}$.

The computing module 42 is configured to compute at least one roll angle limit $\Phi_{lim}$ corresponding to a beginning of stalling of the aircraft 10, and is further configured to compute at least one roll margin $\Delta\Phi_g$, $\Delta\Phi_d$, each roll margin $\Delta\Phi_g$, $\Delta\Phi_d$ depending on the corresponding roll angle limit $\Phi_{lim}$ and the current value of the roll angle $\Phi$.

Each roll margin $\Delta\Phi_g$, $\Delta\Phi_d$ depends on a characteristic value of the angle of attack, said characteristic value of the angle of attack preferably being the angle of attack limit $\alpha_{lim}$ corresponding to a beginning of stalling of the aircraft.

As an optional addition, the computing module 42 is further configured to compute several margins, i.e., a left roll margin $\Delta\Phi_g$ and a right roll margin $\Delta\Phi_d$.

As previously indicated, the angle of attack $\alpha$ is a datum known in itself. Traditionally, the angle of attack $\alpha$ is a measurement available on board the aircraft 10, the latter for example being provided by the set of sensors 18.

Traditionally, different angle of attack limits are computed by alert systems, not shown, on board the aircraft 10, for example:
- a maximum authorized angle of attack $\alpha_{max}$, provided by a protection or alert system, not shown, such as a flight control system or a stall warning system (such as a Stick Shaker/Pusher);
- an angle of attack $\alpha_{prot}$ triggering the protection system in question;
- an angle of attack $\alpha_{SW}$ triggering alerts; and
- an angle of attack $\alpha_{stall}$ for stalling of the aircraft 10.

In the rest of the description, the angle of attack limit will be denoted $\alpha_{lim}$, this preferably being chosen from the aforementioned list of angle of attack limit values $\alpha_{max}$, $\alpha_{prot}$, $\alpha_{SW}$, $\alpha_{stall}$, optionally with an additional margin or by combining two angle of attack limit values from the aforementioned list. The angle of attack limit $\alpha_{lim}$ is preferably chosen to be equal to the maximum authorized angle of attack $\alpha_{max}$.

Preferably, the angle of attack limit $\alpha_{lim}$ optionally used to compute the roll angle $\Phi_{lim}$ will be the same as that for the potential display of the angle of attack margin $\Delta\alpha$ with respect to the limit angle of attack.

The aircraft 10 for example calculates the following mechanical flight lift equation:

$$n_z \times m \times g = \frac{1}{2}\rho \cdot V^2 \times S \times C_{Z\alpha} \times (\alpha - \alpha_0) - F_z \quad (1)$$

where $n_Z$ represents the component along the vertical axis of the aircraft (with the convention axis z oriented upward) of the load factor, with $n_z=1$ in balanced flight
m is the mass of the aircraft and g is the gravitational acceleration,
$(\rho V^2)/2$ represents the dynamic pressure applied to the aircraft 10, with $\rho$ the specific gravity of the air and V the aerodynamic speed of the aircraft 10,
S represents a reference surface of the aircraft 10,
$C_{Z\alpha}$ represents the lift gradient ($C_{Z\alpha}$ positive by convention), specific to the aircraft 10,
$\alpha$ represents the current value of the angle of attack,
$F_z$ represents the component along the vertical axis of the aircraft (with the convention axis z oriented downward) of the propulsion force, and
$\alpha_0$ represents an angle of attack with zero lift, specific to the aircraft 10.

According to a first alternative, the roll angle limit $\Phi_{lim}$ depends on a current value of the angle of attack $\alpha$ of the aircraft, the current value of the roll angle $\Phi$ of the aircraft and the angle of attack limit $\alpha_{lim}$.

In particular, it is considered that in a balanced turn, the vertical component of the load factor is calculated by:

$$n_z = \frac{\cos(\theta)}{\cos(\phi)} \quad (2)$$

with $\Phi$ the current value of the roll angle and $\theta$ the current value of the angle of lie.

From equations (1) and (2), considering a low $\theta$ and neglecting Fz (current hypothesis), one obtains the following equation:

$$\frac{1}{\cos(\phi)} = \frac{1}{m \times g} \times \frac{1}{2}\rho \cdot V^2 \times S \times C_{Z\alpha} \times (\alpha - \alpha_0) \quad (3)$$

Then considering the limit values from equation (3), one obtains the following equation:

$$\frac{1}{\cos(\phi_{lim})} = \frac{1}{m \times g} \times \frac{1}{2}\rho \cdot V^2 \times S \times C_{Z\alpha} \times (\alpha_{lim} - \alpha_0) \quad (4)$$

The following equation is next obtained by combining equations 3) and (4):

$$\frac{\cos(\phi_{lim})}{\cos(\phi)} = \frac{(\alpha - \alpha_0)}{(\alpha_{lim} - \alpha_0)} \quad (5)$$

The roll angle limit $\Phi_{lim}$ then for example is calculated by the following equation:

$$\phi_{lim} = \arccos\left[\cos(\phi) \times \frac{(\alpha - \alpha_0)}{(\alpha_{lim} - \alpha_0)}\right] \quad (6)$$

where $\Phi$ represents the current value of the roll angle,
$\alpha$ represents the current value of the angle of attack,
$\alpha_{lim}$ represents the angle of attack limit, and
$\alpha_0$ represents the angle of attack with zero lift, specific to the aircraft 10.

According to the first alternative, the computing module 42 is then for example configured to compute the roll angle limit $\Phi_{lim}$ according to equation (6) from the current value of the angle of attack $\alpha$ of the aircraft, the current value of the roll angle $\Phi$ of the aircraft, the angle of attack limit $\alpha_{lim}$, and the predefined angle of attack with zero lift $\alpha_0$.

Additionally, the current value of the angle of attack $\alpha$ is computed as a function of one or more measured values of the angle of attack and an estimate of the time derivative of the angle of attack. The current value of the angle of attack is then denoted $\alpha_{hyb}$, corresponding to a hybridization of a measured value of the angle of attack and an estimate of the time derivative of the angle of attack.

The hybridized value of the angle of attack $\alpha_{hyb}$ then for example is calculated by the following equation:

$$\alpha_{hyb} = \frac{1}{K+s} \times (K \cdot \alpha + s \cdot \alpha) = \frac{1}{K+s} \times \left(K \cdot \alpha + \frac{d\alpha}{dt}\right) \quad (7)$$

where K is a gain, for example equal to 1, and
s is the Laplace variable.

To compute an estimate of the time derivative $d/dt(\alpha)$ of the angle of attack, also denoted $\dot{\alpha}$, the following force equilibrium equations on the longitudinal and vertical axes of the aircraft are for example used:

$$m\left[\dot{V} \cdot \cos\alpha \cdot \cos\beta - V \cdot (\sin\alpha \cdot \cos\beta \cdot \dot{\alpha} + \cos\alpha \cdot \sin\beta \cdot \dot{\beta}) + \right. \quad (8)$$
$$V \cdot (q \cdot \sin\alpha \cdot \cos\beta - r \cdot \sin\beta)\Big] =$$
$$-m \cdot g \cdot \sin\theta - \frac{1}{2}\rho \cdot V^2 \times S \times C_X + F_x$$

$$m\left[\dot{V} \cdot \sin\alpha \cdot \cos\beta + V \cdot (\cos\alpha \cdot \cos\beta \cdot \dot{\alpha} - \sin\alpha \cdot \sin\beta \cdot \dot{\beta}) + \right. \quad (9)$$
$$V \cdot (p \cdot \sin\beta - q \cdot \cos\alpha \cdot \cos\beta)\Big] =$$
$$m \cdot g \cdot \cos\theta \cdot \cos\phi - \frac{1}{2}\rho \cdot V^2 \times S \times C_Z + F_z$$

where $\alpha$ represents the current value of the angle of attack,
ß represents the current value of the sideslip angle,
$\theta$ represents the attitude of the aircraft 10,
p, q, r respectively represent the roll rate, the pitch rate, and the yaw rate.
$C_X$, $C_Z$ respectively represent the drag and lift coefficients in the plane of reference of the aircraft (positive by convention),
$F_x$, $F_z$ respectively represent the longitudinal component and the vertical component along the axes of the aircraft of the propulsion force (z downward and x forward).

By further using the hypothesis of a zero constant sideslip (ß=d\dt(ß)=0), a constant airspeed, one obtains the following equation:

$$\dot{\alpha} = q + \frac{g}{V} \times \begin{pmatrix} \sin\theta \times \sin\alpha + \cos\theta \times \cos\phi \times \cos\alpha \\ -\frac{\sin\alpha}{m \cdot g} \cdot \left(-\frac{1}{2}\rho \cdot V^2 \times S \times C_X + F_x\right) + \\ \frac{\cos\alpha}{m \cdot g} \cdot \left(-\frac{1}{2}\rho \cdot V^2 \times S \times C_Z + F_z\right) \end{pmatrix}$$

Furthermore, the longitudinal $n_x$ and vertical $n_z$ components of the load factor are calculated by, by definition, following equations:

$$n_x \cdot m \cdot g = -\frac{1}{2}\rho \cdot V^2 \times S \times C_X + F_x \qquad (11)$$

$$n_z \cdot m \cdot g = \frac{1}{2}\rho \cdot V^2 \times S \times C_Z - F_z \qquad (12)$$

The estimate of the time derivative of the angle of attack $\dot{\alpha}$ then for example are calculated by the following equation:

$$\dot{\alpha} = q + \frac{g}{V} \times (\sin\theta \times \sin\alpha + \cos\theta \times \cos\phi \times \cos\alpha - n_x \times \sin\alpha - n_z \times \cos\alpha) \qquad (13)$$

where q represents the pitch level,
g is the gravitational acceleration, V represents the aerodynamic speed of the aircraft 10,
θ represents the attitude of the aircraft 10,
Φ represents the current value of the roll angle,
α represents the current value of the angle of attack,
$n_x$ represents the longitudinal component of the load factor, and
$n_z$ represents the vertical component of the load factor.

According to this addition, the computing module 42 is then for example configured to compute the roll angle limit $\Phi_{lim}$ according to equation (6) by using the hybridized value of the angle of attack $\alpha_{hyb}$, computed using equations (7) and (13), in place of the current value of the angle of attack α.

According to a second alternative, the roll angle limit $\Phi_{lim}$ depends on a dynamic pressure applied to the aircraft, a lift gradient $C_{Z\alpha}$ specific to the aircraft and the angle of attack limit $\alpha_{lim}$.

The roll angle limit $\Phi_{lim}$ then is calculated by, for example, the following equation, obtained from equation (4):

$$\phi_{lim} = \arccos\left[\frac{2}{\rho \cdot V^2 \times S \times C_{Z\alpha}} \times \frac{m \times g}{(\alpha_{lim} - \alpha_0)}\right] \qquad (14)$$

where $(\rho V^2)/2$ represents the dynamic pressure applied to the aircraft,
S represents a reference surface of the aircraft,
$C_{Z\alpha}$ represents the lift gradient, specific to the aircraft,
m represents the mass of the aircraft, g is the gravitational acceleration,
$\alpha_{lim}$ represents the angle of attack limit, and
$\alpha_0$ represents an angle of attack with zero lift, specific to the aircraft.

According to this second alternative, the computing module 42 is then for example configured to compute the roll angle limit $\Phi_{lim}$ according to equation (14) from the dynamic pressure applied to the aircraft 10, the lift gradient $C_{Z\alpha}$ specific to the aircraft and the angle of attack limit $\alpha_{lim}$.

From the computed roll angle limit $\Phi_{lim}$, for example, according to one of the alternatives previously described, the computing module 42 is configured for the left roll margin $\Delta\Phi_g$ corresponding to a decrease in the roll angle and the right roll margin $\Delta\Phi_d$ corresponding to an increase in the roll angle.

The left roll margin $\Delta\Phi_g$ and the right roll margin $\Delta\Phi_d$ respectively is calculated by the following equations:

$$\Delta\phi_d = \phi_{lim} - \phi \qquad (15)$$

$$\Delta\phi_g = \phi_{lim} + \phi \qquad (16)$$

with $\Phi_{lim}$, Φ representing the computed roll angle limit and the current value of the roll angle, respectively.

As an optional addition, the computing module 42 is further configured to filter each computed roll margin $\Delta\Phi_g$, $\Delta\Phi_d$, for example using an order one low-pass filter with a time constant of about 100 ms.

The current value of the roll angle Φ is an algebraic value, with the convention according to which this value is positive when the aircraft 10 performs a rotation on the right around its longitudinal axis and relative to its direction of advance, and negative when the aircraft 10 performs a rotation on the left.

The roll angle limit $\Phi_{lim}$ is a positive value, and one skilled in the art will then understand that at least one roll margin $\Delta\Phi_g$, $\Delta\Phi_d$ is equal to the difference between the roll angle limit $\Phi_{lim}$ and the absolute value of the roll angle Φ, this margin being the right roll margin $\Delta\Phi_d$ when the current value of the roll angle Φ is positive, or the left roll margin $\Delta\Phi_g$ when the current value of the roll angle Φ is negative.

As an optional addition, the computing module 42 is configured to compute, among the left roll margin $\Delta\Phi_g$ and the right roll margin $\Delta\Phi_d$, only that which is equal to the difference between the roll angle limit $\Phi_{lim}$ and the absolute value of the roll angle Φ.

The display module 44 is configured to display, on the screen 34, the first symbol 50, 60 indicating a current orientation of the aircraft 10, and is further configured, when the display condition is verified, to display, on the screen 34, at least one second symbol 52A, 52B positioned relative to the first symbol 50, 60, the deviation between each second symbol 52A, 52B and the first symbol 50, 60 representing a respective roll margin $\Delta\Phi_g$, $\Delta\Phi_d$.

The display condition is verified in particular when the absolute value of the current value of the roll angle Φ is above a predefined threshold. The predefined threshold for example has a value comprised between 40° and 50°, preferably equal to 45°. When the display condition is verified, the display module 44 is then configured to automatically display each second symbol 52A, 52B on the screen 34.

The display module 44 is for example configured to display a single second symbol 52A, 52B corresponding to the minimum roll margin among the left roll margin $\Delta\Phi_g$ and the right roll margin $\Delta\Phi_d$, i.e., the roll margin equal to the difference between the roll angle limit $\Phi_{lim}$ and the absolute value of the roll angle Φ. The display module 44 is then configured to display either a second symbol 52A associated with the right roll margin $\Delta\Phi_d$, or a second symbol 52A associated with the left roll margin $\Delta\Phi_g$.

Alternatively, the display module 44 is configured to display two second symbols 52A, 52B, i.e., the second symbol 52A associated with the right roll margin $\Delta\Phi_d$ and the second symbol 52A associated with the left roll margin $\Delta\Phi_g$, each one being positioned relative to the corresponding first symbol 50, 60.

As optional addition, the display module 44 is configured to display a third symbol 54 positioned relative to the first symbol formed by the speed vector symbol 50, the deviation between the third symbol 54 and the first symbol 50 representing the angle of attack margin $\Delta\alpha$. The third symbol 54 is preferably connected to each displayed second symbol 52A, 52B.

The operation of the electronic piloting aid device 14 according to the invention will now be described using FIG. 2, showing a flowchart of the piloting aid method according to the invention.

During an initial step 100, performed regularly, the acquisition module 40 acquires the current value of the roll angle $\Phi$ of the aircraft 10, and the computing module 42 computes the roll angle limit $\Phi_{lim}$ corresponding to a beginning of stalling of the aircraft, for example, according to one of the alternatives previously described.

As an optional addition, the acquisition module 40 further acquires the current value of the angle of attack $\alpha$ of the aircraft 10, the angle of attack limit $\alpha_{lim}$, and the predefined zero lift angle of attack $\alpha_0$, and sends them to the computing module 42, to compute the roll angle limit $\Phi_{lim}$.

Alternatively, the acquisition module 40 further acquires the dynamic pressure $(\rho V^2)/2$ applied to the aircraft, the lift gradient $C_{Z\alpha}$ specific to the aircraft and the angle of attack limit $\alpha_{lim}$, and sends them to the computing module 42, to compute the roll angle limit $\Phi_{lim}$.

The computing module 42 next computes, during step 110, at least one roll margin $\Delta\Phi_g$, $\Delta\Phi_d$, using equation (15) and/or (16), each roll margin $\Delta\Phi_g$, $\Delta\Phi_d$ depending on the roll angle limit $\Phi_{lim}$ computed during step 100 and the current value of the roll angle $\Phi$ acquired during step 100.

The display module 44 then displays, during a following step 120 and on the screen 34, a first symbol, such as the speed vector symbol 50 or the artificial horizon line 60, indicating the current orientation of the aircraft.

Furthermore, when the display condition is verified, the display module 44 displays, on the screen 34, at least one second symbol 52A, 52B positioned relative to the first symbol 50, 60, the deviation between each second symbol 52A, 52B and the first symbol 50, 60 representing a respective roll margin $\Delta\Phi_g$, $\Delta\Phi_d$.

FIGS. 3 to 18 then illustrate, for different configurations of the aircraft 10, the display of the first symbol 50, 60 and the second symbol(s) 52A, 52B.

According to a first example of the second symbols 52A, 52B, in FIGS. 3 to 6, each second symbol 52A, 52B is represented in the form of a vertical segment, and the two second symbol 52A, 52B are connected to one another by the third symbol 54 in the form of a horizontal segment.

Figure 4:
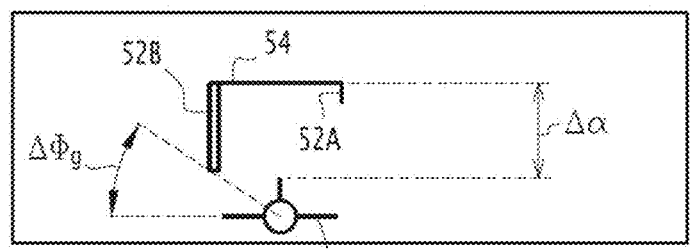

According to the first example, each roll margin $\Delta\Phi_g$, $\Delta\Phi_d$ is shown in angular form between a corresponding wing of the speed vector symbol 50 and the bottom of the segment forming the corresponding second symbol 52A, 52B, as shown in FIGS. 3 and 4.

According to one optional additional aspect of this first example, the second symbol 52A, 52B corresponding to the minimum roll margin is further displayed with a segment having a thickness greater than that of the segment corresponding to the other second symbol 52A, 52B. In the example of FIG. 3, the minimum roll margin is the right roll margin $\Delta\Phi_d$, and the second symbol 52A is that having the greatest thickness. In the example of FIG. 4, the minimum roll margin is the left roll margin $\Delta\Phi_g$, and the second symbol 52B has the greatest thickness.

As previously indicated, the deviation between the third symbol 54 and the speed vector symbol 50 represents the angle of attack margin $\Delta\alpha$, visible in FIG. 4, this angle of attack margin more precisely corresponding to the deviation between the top of the speed vector symbol 50 and the third symbol 54.

Figure 5:
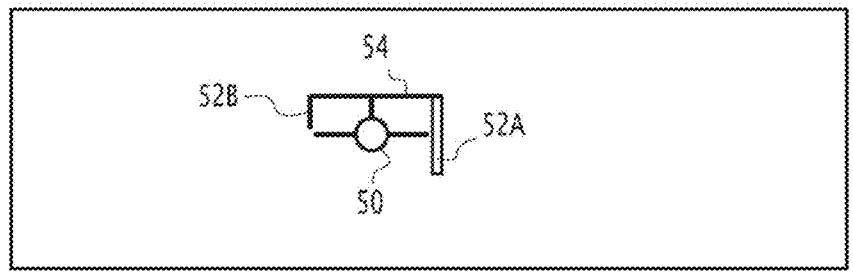

In the example of FIG. 5, the angle of attack margin $\Delta\alpha$ is null, and the roll margin $\Delta\Phi_g$, $\Delta\Phi_d$ is also null.

Figure 6:
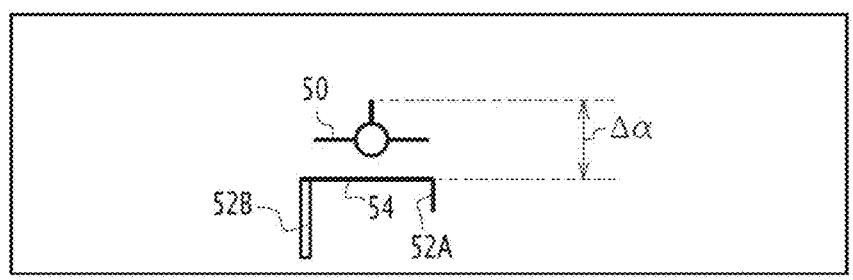

The example of FIG. 6 corresponds to a negative angle of attack margin $\Delta\alpha$, and also to a negative roll margin $\Delta\Phi_g$, $\Delta\Phi_d$, the aircraft 10 already having stalled.

According to a second example of the second symbol 52A, 52B, in FIGS. 7 to 10, each second symbol 52A, 52B is represented in the form of a radial segment, and the two second symbols 52A, 52B are connected to one another by the third symbol 54 in the form of an arc of circle.

Figure 7:
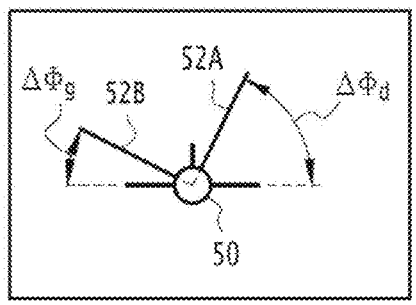
FIGS. 7 to 10 are views similar to those of FIGS. 3 to 6, according to a second example of the second symbols.
Figure 8:
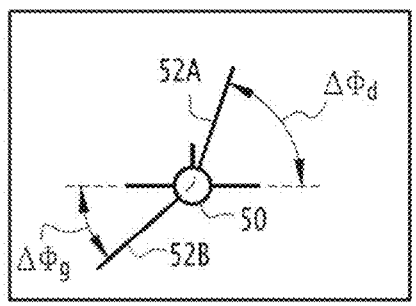
Figure 9:
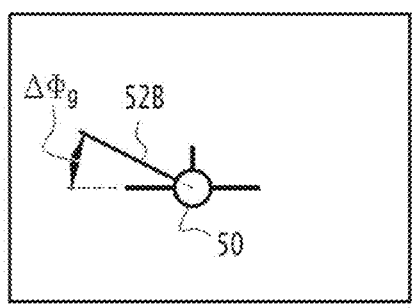

According to the second example, each roll margin $\Delta\Phi_g$, $\Delta\Phi_d$ is shown in angular form between the corresponding wing of the speed vector symbol 50 and the segment forming the corresponding second symbol 52A, 52B, as shown in FIGS. 7 to 9.

Figure 10:
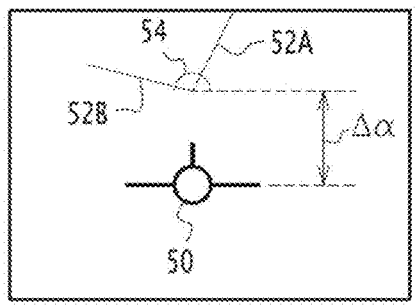

The right roll margin $\Delta\Phi_d$ is positive in the example of FIGS. 7, 8 and 10, and is not shown in the example of FIG. 9.

One skilled in the art will observe that in the example of FIG. 9, only the left roll margin $\Delta\Phi_g$ is shown, the left roll margin $\Delta\Phi_g$ in this example being the smallest roll margin, i.e., the most critical, among the left roll margin $\Delta\Phi_g$ and the right roll margin $\Delta\Phi_d$.

The left roll margin $\Delta\Phi_g$ is positive in the example of FIGS. 7, 9 and 10, and is negative in the example of FIG. 8, the aircraft 10 having already stalled on its left in this last example.

As an optional addition, the deviation between the first symbol 54 and the speed vector symbol 50 represents the angle of attack margin $\Delta\alpha$, visible in FIG. 10, this angle of attack margin more precisely corresponding to the deviation between the wings of the speed vector symbol 50 and the bottom of the third symbol 54. In the example of FIGS. 7 to 9, the angle of attack margin is not shown, and it is positive in the example of FIG. 10.

Figure 12:
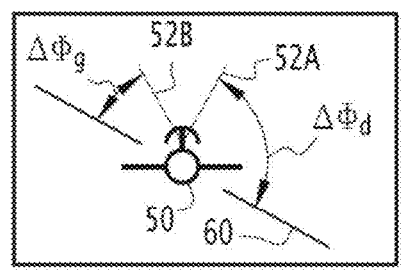
Figure 13:
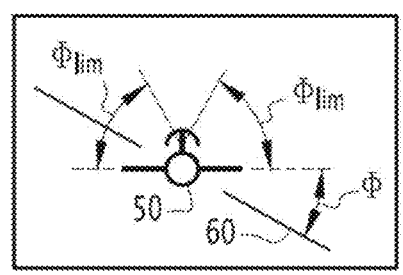
Figure 14:
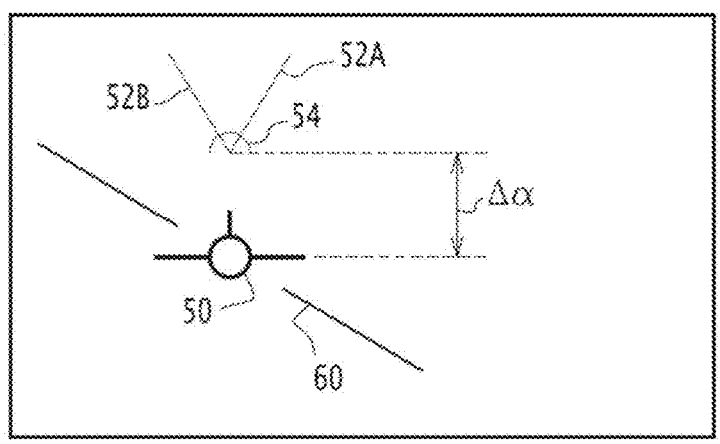

According to a third example of the second symbols 52A, 52B, in FIGS. 11 to 14, each second symbol 52A, 52B is shown in the form of a radial segment, and the two second symbols 52A, 52B are connected to one another by the third symbol 54 in the form of an arc of circle, visible in FIG. 14.

According to the third example, each roll margin $\Delta\Phi_g$, $\Delta\Phi_d$ is shown in angular form between the horizon line 60 forming the first symbol and the segment forming the corresponding second symbol 52A, 52B, as shown in FIG. 12.

Figure 11:
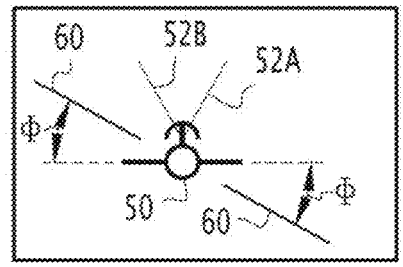
FIGS. 11 to 14 are views similar to those of FIGS. 3 to 6, according to a third example of the second symbols.

A same example configuration of the aircraft 10 is shown three times in FIGS. 11 to 13 for legibility of the drawings, with the indication of the roll angle $\Phi$ in FIG. 11, the right roll margin $\Delta\Phi_d$ and the left roll margin $\Delta\Phi_g$ in FIG. 12, and the roll angle limit $\Phi_{lim}$ in FIG. 13, the roll angle $\Phi$ corresponding to the angular deviation between the wings of the speed vector symbol 50 and the horizon line 60, respectively.

As an optional addition, the deviation between the third symbol 54 and the speed vector symbol 50 represents the angle of attack margin $\Delta\alpha$, shown in FIG. 14, this angle of attack margin $\Delta\alpha$ more specifically corresponding to the deviation between the wings of the speed vector symbol 50 and the bottom of the third symbol 54.

In the example of FIGS. 11 to 13, the angle of attack margin $\Delta\alpha$ is not explicitly indicated, while being slightly positive. The angle of attack margin $\Delta\alpha$ is positive in the example of FIG. 14, and has a greater value in this example than in that of FIGS. 11 to 13.

Figure 15:
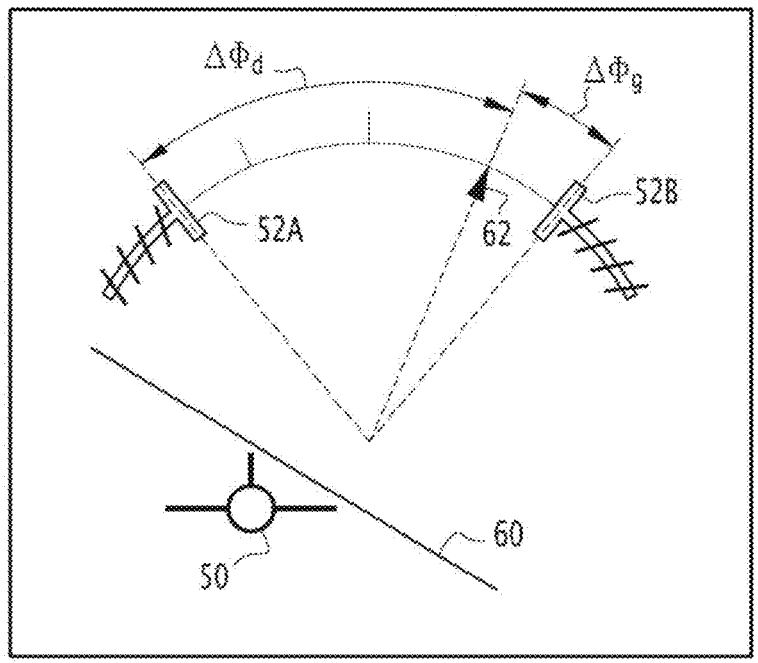
FIGS. 15 and 16 are views similar to those of FIGS. 3 and 4, according to a fourth example of the second symbols.
Figure 16:
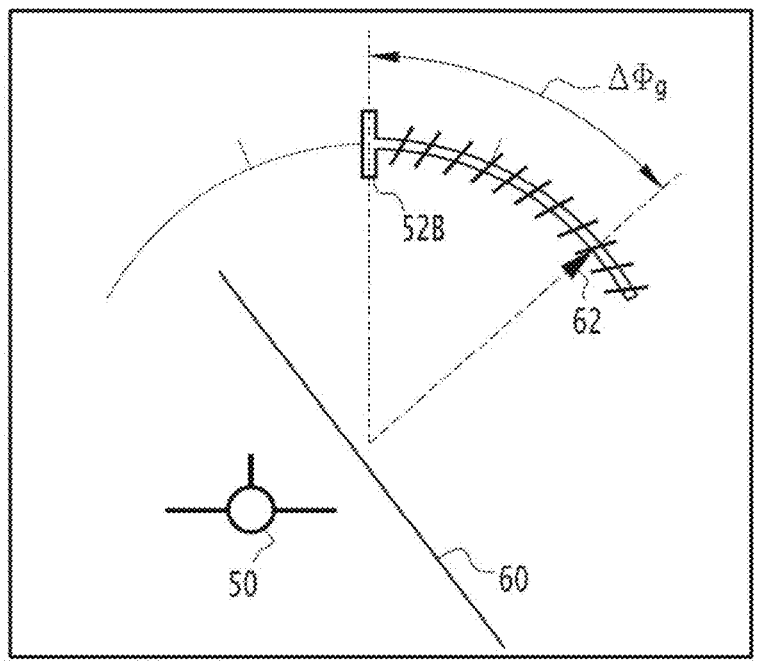

According to a fourth example of the two symbols 52A, 52B, in FIGS. 15 and 16, each second symbol 52A, 52B is shown in the form of a radial segment added on a traditional roll diagram, centered on the nose of the aircraft 10.

According to this fourth example, each roll margin $\Delta\Phi_g$, $\Delta\Phi_d$ is for represented in angular form between a pointer 62 representing the value of the roll angle $\Phi$ on the roll diagram and the segment forming the corresponding second symbol 52A, 52B, as shown in FIGS. 15 and 16.

The right roll margin $\Delta\Phi_d$ is positive in the example of FIG. 15, and is not shown in the example of FIG. 16.

One skilled in the art will note that in the example of FIG. 16, only the left roll margin $\Delta\Phi_g$, is shown, and that it is further negative, the aircraft 10 already having stalled on its left in this example. The left roll margin $\Delta\Phi_g$ is positive in the example of FIG. 15.

As an optional addition, the crosshatched zones represent prohibited zones corresponding to stalling of the aircraft and in which the pointer 62 representing the value of the roll angle $\Phi$ must not be found. The prohibited zone on the left is associated with the left roll margin $\Delta\Phi_g$ and visible on the right in FIG. 15, and the prohibited zone on the right is associated with the right roll margin $\Delta\Phi_d$ and visible on the left in FIG. 15. In the example of FIG. 16, the prohibited zone on the left and the second symbol 52B of the left roll margin $\Delta\Phi_g$ are shown, and the pointer 62 of the roll angle $\Phi$ is in the prohibited zone on the left, the aircraft 10 having already stalled on its left in this example.

The speed vector symbol 50 and the horizon line 60 are illustrated optionally in this fourth example.

Figure 17:
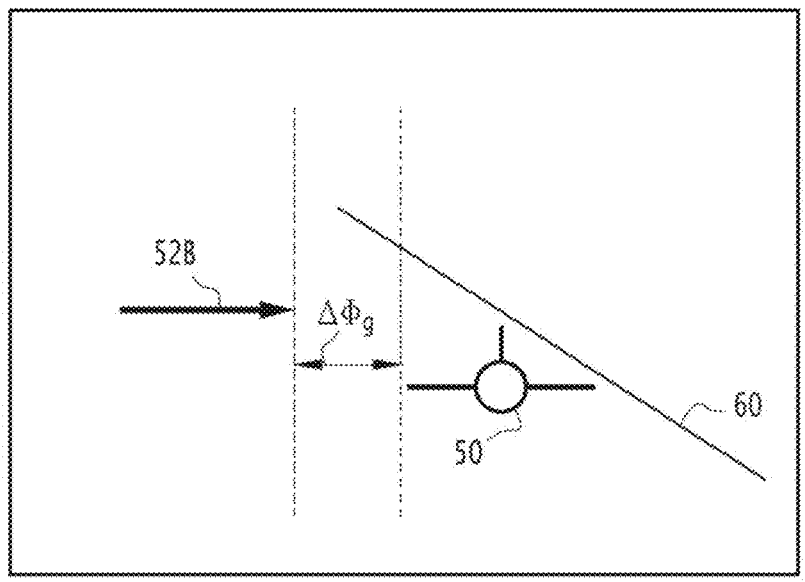
FIGS. 17 and 18 are views similar to those of FIGS. 3 and 4, according to a fifth example of the second symbols.
Figure 18:
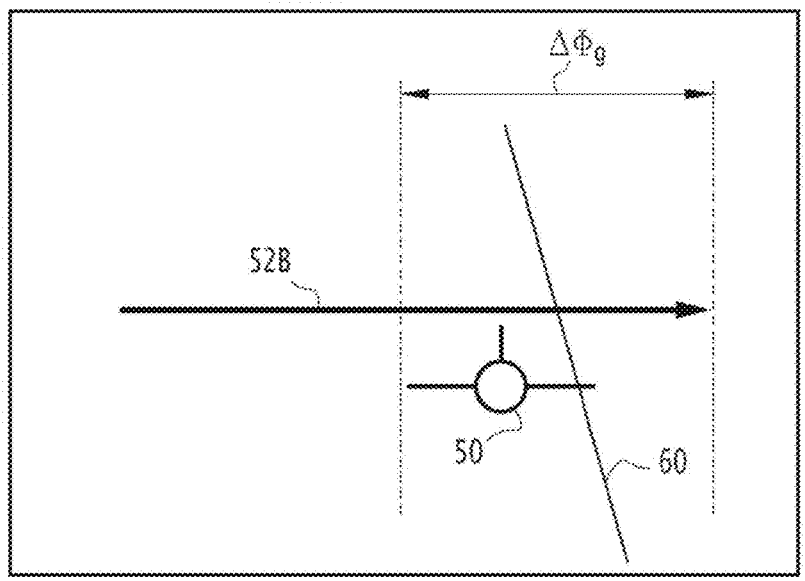

According to a fifth example of the second symbols 52A, 52B, in FIGS. 17 and 18, each second symbol 52A, 52B is shown in the form of an arrow aligned with the wings of the speed vector symbol 50.

According to the fifth embodiment, each roll margin $\Delta\Phi_g$, $\Delta\Phi_d$ is shown in the form of a distance between a corresponding wing of the speed vector symbol 50 and the tip of the arrow forming the corresponding second symbol 52A, 52B, as shown in FIGS. 17 and 18.

More specifically, the second symbol 52B of the left roll margin is shown in the form of an arrow on the left of the speed vector symbol 50, and oriented from left to right, and the left roll margin $\Delta\Phi_g$ then corresponds to the distance between the tip of the arrow and the edge of the left wing of the speed vector symbol 50. The left roll margin $\Delta\Phi_g$ is negative when the tip of the arrow forming the second symbol 52B has exceeded, from the left, the left edge of the speed vector symbol 50 in the direction corresponding to the wings of the speed vector symbol.

Similarly, the second symbol 52A of the right roll margin is shown in the form of an arrow on the right of the speed vector symbol 50, and oriented from right to left, and the right roll margin $\Delta\Phi_d$ then corresponds to the distance between the tip of this arrow and the edge of the right wing of the speed vector symbol 50. The right roll margin $\Delta\Phi_d$ is negative when the tip of the arrow forming the second symbol 52A has exceeded, from the right, the right edge of the speed vector symbol 50 in the direction corresponding to the wings of the speed vector symbol.

This illustration then allows the pilot to more easily see the side from which a risk of stalling of the aircraft 10 is arising.

The right roll margin $\Delta\Phi_d$ is not shown in the example of FIGS. 17 and 18. One skilled in the art will observe that in this example of FIGS. 17 and 18, only the left margin $\Delta\Phi_g$ is shown, the left roll margin $\Delta\Phi_g$ being positive in the example of FIG. 17, and negative in the example of FIG. 18, the aircraft 10 having already stalled on its left in this last example.

The horizon line 60 is illustrated optionally in this fifth example.

Thus, the electronic device 14 and method for aiding in the piloting an aircraft make it possible to display, when necessary, one or more roll margins $\Delta\Phi_g$, $\Delta\Phi_d$ relative to a beginning of stalling of the aircraft 10, which give the pilot a relevant indication regarding a potential risk of stalling, while allowing him to easily assess the margin relative to this risk.

The electronic device 14 and the method for aiding in the piloting of an aircraft then help the pilot better anticipate a risk of stalling of the aircraft 10, while decreasing the cognitive load requested from the pilot, and therefore improving flight safety.

As an optional addition, each roll margin $\Delta\Phi_g$, $\Delta\Phi_d$ depends on a characteristic value of the angle of attack, the characteristic value of the angle of attack preferably being at the angle of attack limit $\alpha_{lim}$ corresponding to a beginning of stalling of the aircraft 10, which allows a more precise computation of each roll margin $\Delta\Phi_g$, $\Delta\Phi_d$.

Also as an optional addition, to compute the roll angle limit $\Phi_{lim}$, $\Phi_{lim\_g}$, $\Phi_{lim\_d}$, the current value of the angle of attack $\alpha$ is computed as a function of one or more measured values of the angle of attack and an estimate of the time derivative of the angle of attack, which makes it possible to have a more precise current value of the angle of attack $\alpha$.

Furthermore, only one roll margin from among the left roll margin $\Delta\Phi_g$ and the right roll margin $\Delta\Phi_d$ is displayed, the displayed roll margin then being the most critical roll margin, which makes it possible to better focus the pilot's attention on the corrective action to be taken.

Also as an optional addition, the display condition is verified when the absolute value of the current value of the roll angle $\Phi$ is above a predefined threshold, the display module 44 then being configured to automatically display each second symbol 52A, 52B on the screen. This then makes it possible to automatically display one or more additional indications for the pilot, i.e., the roll margin(s) $\Delta\Phi_g$, $\Delta\Phi_d$, only in a situation corresponding to a potential risk of stalling of the aircraft 10, and a contrario not to needlessly bother the pilot in a situation not corresponding to a potential stall of the aircraft 10.

According to a second embodiment, the computing module 42 is further configured to compute several roll angle limits, i.e., a left roll angle limit $\Phi_{lim\_g}$ and a right roll angle limit $\Phi_{lim\_d}$.

According to the second embodiment, two current values, measured or estimated, of the angle of attack $\alpha$ are used, i.e., one for each side or direction of roll (left or right), i.e., a current left value of the roll angle $\alpha_{gauche}$ and a current right value of the roll angle $\alpha_{droit}$. On a fixed-wing aircraft, each angle of attack $\alpha$ represents the average angle of attack of one of the wings. The angle of attack of each wing is for example measured by using sensors 18 placed on each wing, or estimated by simply using an average angle of attack of the aircraft 10, also called global angle of attack.

To compute an estimate of the angle of attack of each wing from the average angle of attack of the aircraft 10, the roll rate and sideslip rate of the aircraft 10 are for example taken into account. Considering a wing element at a lateral distance L from the center of rotation of the aircraft 10, with V representing the airspeed, the angle of attack variation $\Delta\alpha_p$ generated by the rotation then calculates the equation:

$$\Delta\alpha_p = \arctan\left(\frac{L \times p}{V}\right) \approx \frac{L \times p}{V} \quad (17)$$

The generated angle of attack variation $\Delta\alpha_r$ then calculates the equation:

$$\Delta\alpha_r = \arctan\left(\frac{\tan\alpha}{1 + \frac{L \times r}{V}}\right) - \alpha \approx \frac{-\alpha \times L \times r}{V} \quad (18)$$

Thus, considering a characteristic or average value of the lateral distance L, this distance is specific to the aircraft, for example 10 m, and one obtains the correction to be applied to obtain the left and right angles of attack:

$$\alpha_{droite} = \alpha + (\Delta\alpha_p + \Delta\alpha_r) \quad (19)$$

$$\alpha_{gauche} = \alpha - (\Delta\alpha_p + \Delta\alpha_r) \quad (20)$$

The computing module 42 is configured to compute the left roll angle limit $\Phi_{lim\_g}$, for example using equation (6) according to the first alternative, by using the current left value of the roll angle $\alpha_{gauche}$ in place of the current value of the roll angle $\alpha$.

Similarly, the computing module 42 is configured to compute the right roll angle limit $\Phi_{lim\_d}$, for example using equation (6) according to the first alternative, by using the current right value of the roll angle $\alpha_{droit}$, in place of the current value of the roll angle $\alpha$.

The left roll margin $\Delta\Phi_g$ and the right roll margin $\Delta\Phi_d$ respectively are calculated by the following equations:

$$\Delta\Phi_d = \Phi_{lim\_d} - \Phi \quad (21)$$

$$\Delta\Phi_g = \Phi_{lim\_g} - \Phi \quad (22)$$

with $\Phi_{lim\_d}$, $\Phi_{lim\_g}$, $\Phi$ respectively representing the computed left roll angle limit, the computed right roll angle limit, and the current value of the roll angle.

The computing module 42 is configured to compute each computed roll margin $\Delta\Phi_g$, $\Delta\Phi_d$, using equation (21) and/or (22).

As an optional addition, the computing module 42 is further configured to filter each computed roll margin $\Delta\Phi_g$, $\Delta\Phi_d$, for example using an order one low-pass filter with a time constant of about 100 ms.

The acquisition module 40 and the display module 44 according to this second embodiment are similar to those of the first embodiment previously described.

The operation of the piloting device 14 according to the second embodiment is then similar to that of the piloting a device 14 according the first embodiment, previously described, with the only difference that two roll angle limits are computed, whereas a single roll angle limit is computed in the first embodiment.

The advantages of the second embodiment comprise those of the first embodiment, and the piloting aid device 14 according to the second embodiment further makes it possible to compute the left roll margin $\Delta\Phi_g$ and the right roll margin $\Delta\Phi_d$ slightly more precisely, each roll margin $\Delta\Phi_g$, $\Delta\Phi_d$ being computed from a dedicated roll angle limit.

One can thus see that the electronic device 14 and the method for aiding with the piloting of an aircraft allow the pilot to better anticipate a risk of stalling of the aircraft 10, while decreasing the cognitive load requested from the pilot, and then improving flight safety.

The invention claimed is:

1. An electronic device for aiding with the piloting of an aircraft, the device comprising:
    an acquisition module, configured to acquire a current value of the roll angle of the aircraft,
    a computing module, configured to compute at least one roll angle limit corresponding to a beginning of stalling of the aircraft, and
    a display module, configured to display, on a screen, a first symbol indicating a current orientation of the aircraft,
    wherein the computing module is further configured to compute at least one roll margin, each roll margin depending on a corresponding roll angle limit and the current value of the roll angle, and
    wherein the display module is further configured, when a display condition is verified, to display, on the screen, at least one second symbol positioned relative to the first symbol, the deviation between each second symbol and the first symbol representing a respective roll margin,
    wherein each roll angle limit depends on a current value of the angle of attack of the aircraft, the current value of the roll angle of the aircraft and an angle of attack limit corresponding to a beginning of stalling of the aircraft.

2. The device according to claim 1, wherein at least one roll margin is equal to the difference between a corresponding roll angle limit and the current value of the roll angle.

3. The device according to claim 1, wherein each roll margin depends on a characteristic value of the angle of attack.

4. The device according to claim 1, wherein each roll angle limit is calculated by the following equation:

$$\phi_{lim} = \arccos\left[\cos(\phi) \times \frac{(\alpha - \alpha_0)}{(\alpha_{lim} - \alpha_0)}\right]$$

where $\Phi$ represents the current value of the roll angle,
$\alpha$ represents the current value of the angle of attack,
$\alpha_{lim}$ represents the angle of attack limit, and
$\alpha_0$ represents an angle of attack with zero lift, specific to the aircraft.

5. The device according to claim 1, wherein the current value of the angle of attack is computed as a function of a measured value of the angle of attack and an estimate of the time derivative of the angle of attack.

6. The device according to claim 5, wherein the estimate of the time derivative of the angle of attack is calculated by the following equation:

$$\dot{\alpha} = q + \frac{g}{V} \times (\sin\theta \times \sin\alpha + \cos\theta \times \cos\phi \times \cos\alpha - n_x \times \sin\alpha - n_z \times \cos\alpha)$$

where q represents the pitch level,
g is the gravitational acceleration, V represents the aerodynamic speed of the aircraft,
θ represents the attitude of the aircraft,
$\Phi$ represents the current value of the roll angle,
$\alpha$ represents the current value of the angle of attack,
$n_x$ represents the longitudinal component of the load factor, and
$n_z$ represents the vertical component of the load factor.

7. The device according to claim 1, wherein each roll angle limit depends on a dynamic pressure applied to the aircraft, a lift gradient specific to the aircraft and the angle of attack limit corresponding to a beginning of stalling of the aircraft.

8. The device according to claim 7, wherein each roll angle limit is calculated by the following equation:

$$\phi_{lim} = \arccos\left[\frac{2}{\rho \cdot V^2 \times S \times C_{Z\alpha}} \times \frac{m \times g}{(\alpha_{lim} - \alpha_0)}\right]$$

where $(\rho V^2)/2$ represents the dynamic pressure applied to the aircraft,

S represents a reference surface of the aircraft, $C_{Z\alpha}$ represents the lift gradient, specific to the aircraft, m represents the mass of the aircraft, g is the gravitational acceleration, $\alpha_{lim}$ represents the angle of attack limit, and $\alpha_0$ represents an angle of attack with zero lift, specific to the aircraft.

9. The device according to claim 1, wherein the computing module is further configured to compute several roll margins.

10. The device according to claim 9, wherein the computing module is further configured to compute several roll angle limits.

11. The device according to claim 1, wherein the first symbol indicating a current orientation of the aircraft is chosen from among a speed vector symbol of the aircraft and an artificial horizon line.

12. The device according to claim 1, wherein the display condition is verified when the absolute value of the current value of the roll angle is above a predefined threshold, and the display module is then configured to automatically display each second symbol on the screen.

13. A method for aiding with the piloting of an aircraft, the method being implemented by an electronic device and comprising:

acquiring a current value of the roll angle of the aircraft, computing at least one roll angle limit corresponding to a beginning of stalling of the aircraft, and displaying, on a screen, a first symbol indicating a current orientation of the aircraft, computing at least one roll margin, each roll margin depending on a corresponding roll angle limit and the current value of the roll angle, and when a display condition is verified, displaying, on the screen, at least one second symbol positioned relative to the first symbol, the deviation between each second symbol and the first symbol representing a respective roll margin, wherein each roll angle limit depends on a current value of the angle of attack of the aircraft, the current value of the roll angle of the aircraft and an angle of attack limit corresponding to a beginning of stalling of the aircraft.

14. A non-transitory computer-readable medium including a computer program including software instructions which, when implemented by a computer, cause the computer to:

acquire a current value of the roll angle of the aircraft, compute at least one roll angle limit corresponding to a beginning of stalling of the aircraft, display, on a screen, a first symbol indicating a current orientation of the aircraft, compute at least one roll margin, each roll margin depending on a corresponding roll angle limit and the current value of the roll angle, and when a display condition is verified, display on the screen at least one second symbol positioned relative to the first symbol, the deviation between each second symbol and the first symbol representing a respective roll margin, wherein each roll angle limit depends on a current value of the angle of attack of the aircraft, the current value of the roll angle of the aircraft and an angle of attack limit corresponding to a beginning of stalling of the aircraft.

15. An electronic device for aiding with the piloting of an aircraft, the device comprising:

an acquisition module, configured to acquire a current value of the roll angle of the aircraft, a computing module, configured to compute at least one roll angle limit corresponding to a beginning of stalling of the aircraft, and a display module, configured to display, on a screen, a first symbol indicating a current orientation of the aircraft, wherein the computing module is further configured to compute at least one roll margin, each roll margin depending on a corresponding roll angle limit and the current value of the roll angle, and wherein the display module is further configured, when a display condition is verified, to display, on the screen, at least one second symbol positioned relative to the first symbol, the deviation between each second symbol and the first symbol representing a respective roll margin, wherein the display condition is verified when the absolute value of the current value of the roll angle is above a predefined threshold, and the display module is then configured to automatically display each second symbol on the screen.

* * * * *